DANIEL A. DOUGHERTY, OF KITTANNING, PENNSYLVANIA, ASSIGNOR TO HIMSELF, E. A. BRODHEAD, AND JAMES M. TAYLOR.

Letters Patent No. 87,094, dated February 23, 1869.

IMPROVED BLACK INK.

The Schedule referred to in these Letters Patent and making part of the same.

*To all whom it may concern:*

Be it known that I, DANIEL A. DOUGHERTY, of Kittanning, in the county of Armstrong, in the State of Pennsylvania, have invented a new and improved Mode of Manufacturing Black Ink, or writing-fluid; and I do hereby declare that the following is a full and exact description thereof.

The nature of my invention consists in using aniline-blue for coloring and rendering ineffaceable, black ink, or writing-fluid, made in any of the usual forms, from nutgalls or tannin, and the salts of iron. I also claim that there is a chemical combination of the aniline-blue with the salts of iron and tannin, which makes it more difficult to efface than when colored with the neutral sulphate of indigo.

To enable others skilled in the art to make and use my invention, I will proceed to describe its mode of manufacture.

I take three pounds of nutgalls, bruised, two pounds of sulphate of iron, two ounces of ground cloves, and digest them in ten gallons of pure water, for two weeks, at a temperature between 70° and 100°; then I draw off the clear liquor, and add three ounces of aniline-blue, dissolved in half a gallon of hot water, and lastly, two drachms of corrosive sublimate. These proportions may be varied to some extent, and still a good result obtained.

What I claim as my invention, and desire to secure by Letters Patent, is—

The combination of aniline-blue with the salts of iron and galls or tannin, for the purpose of coloring and rendering ineffaceable, black ink, or writing-fluid.

DANIEL A. DOUGHERTY.

Witnesses:
 Jo. S. ALEXANDER,
 G. C. LIGHTCAP.